Oct. 27, 1970  R. O. CHAMBERS ET AL  3,535,954
HIGH SPEED TRACTOR TRANSMISSION
Filed Sept. 19, 1968  3 Sheets-Sheet 1
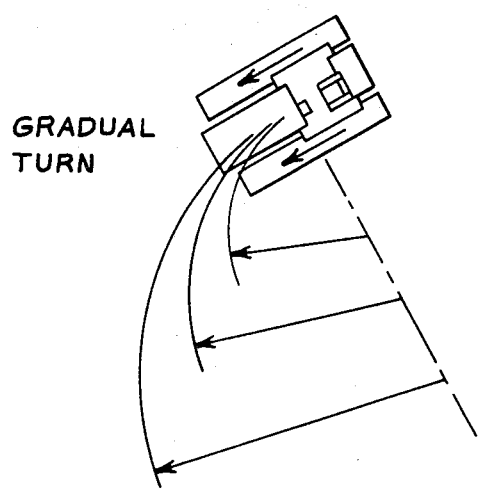
GRADUAL TURN
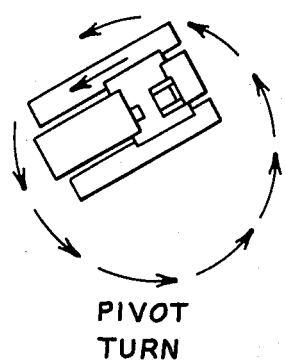
PIVOT TURN
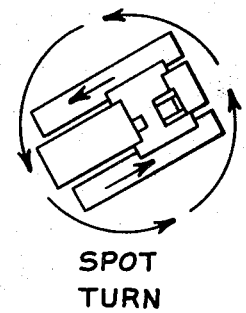
SPOT TURN
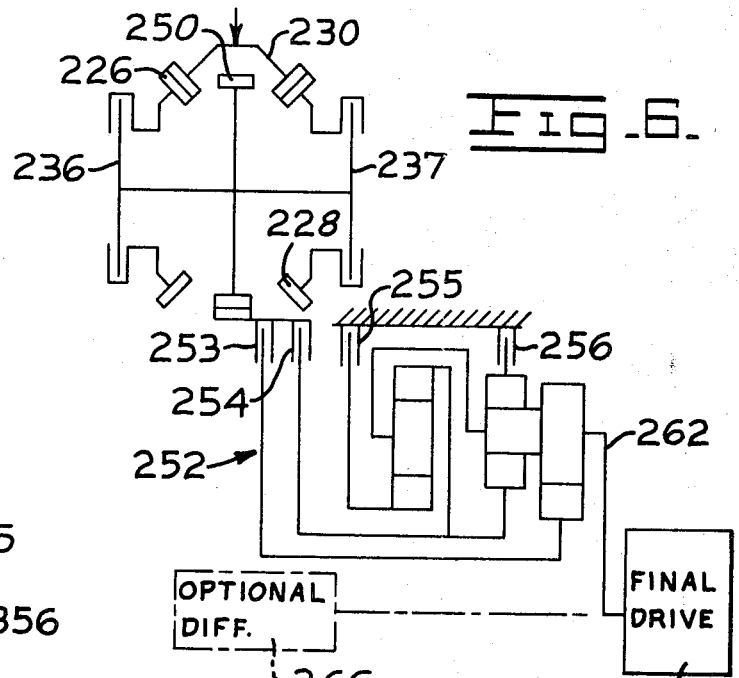
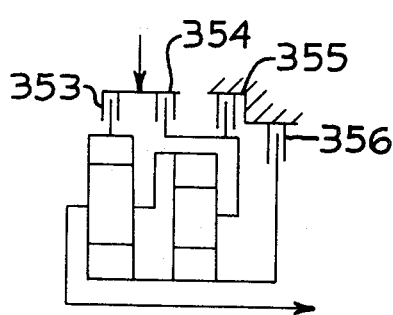
INVENTORS
ROBERT O. CHAMBERS
WILLIS E. WINDISH
BY
ATTORNEYS

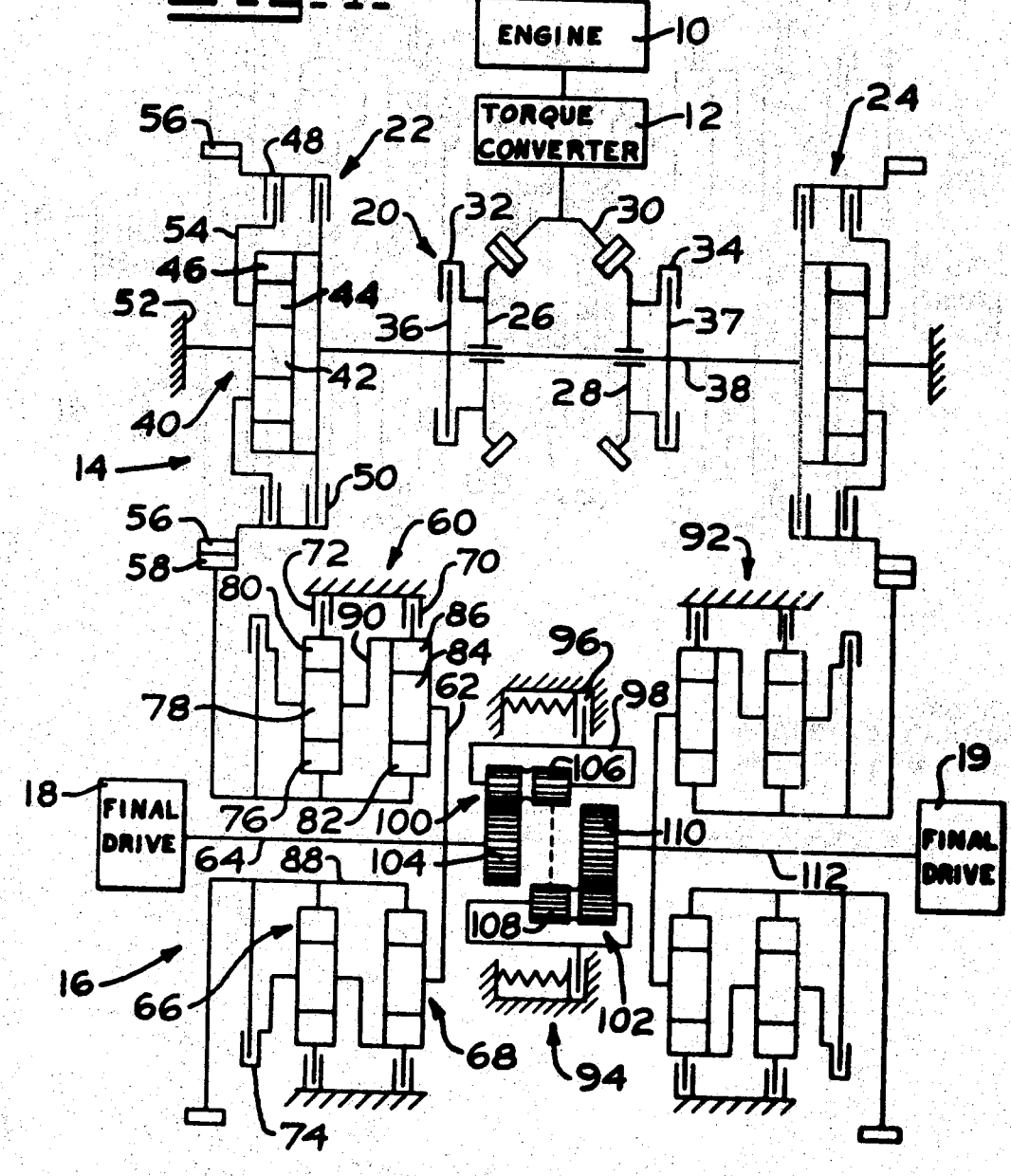

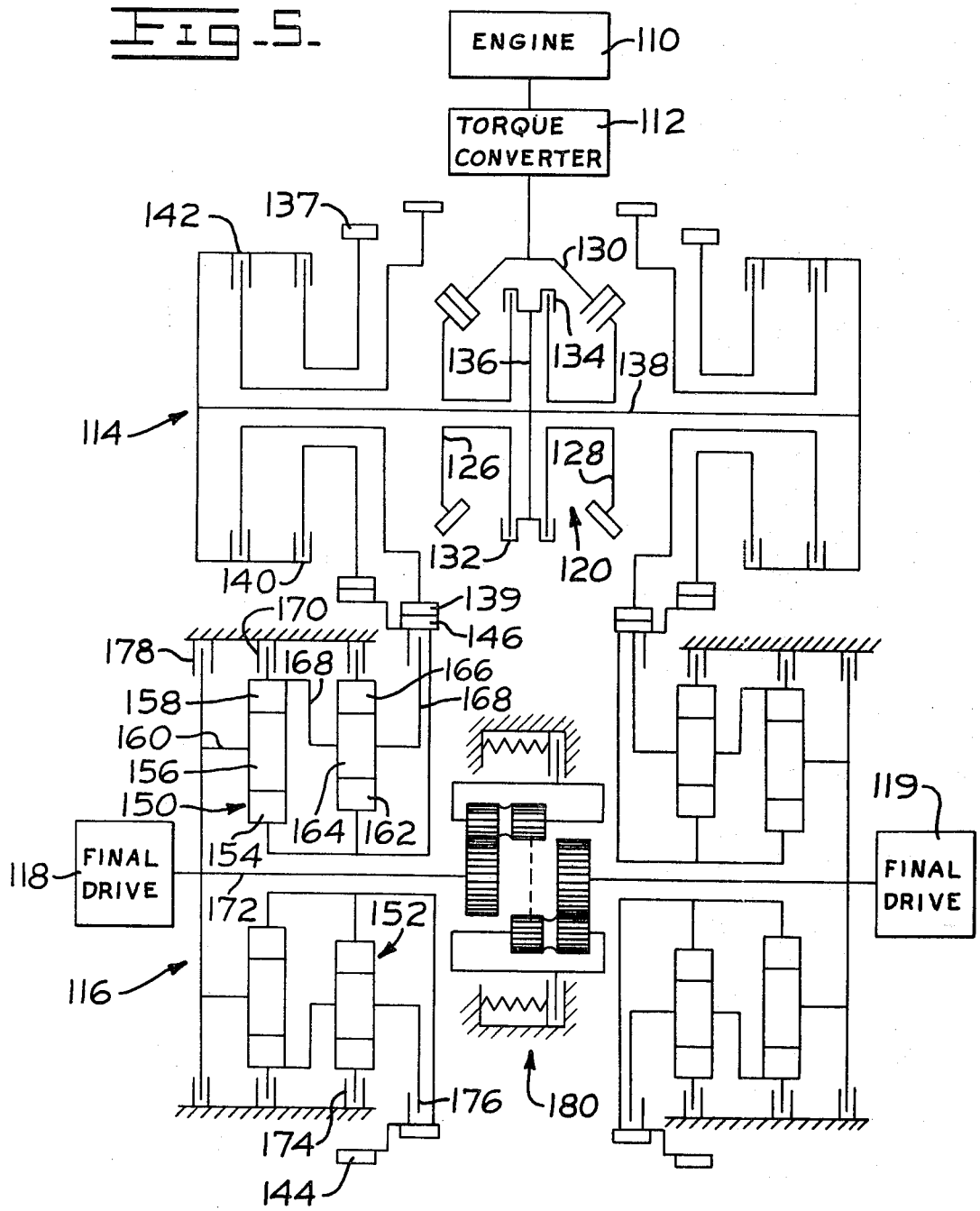

United States Patent Office 3,535,954
Patented Oct. 27, 1970

3,535,954
HIGH SPEED TRACTOR TRANSMISSION
Robert O. Chambers, West Medford, Mass., and Willis E. Windish, Pekin, Ill., assignors to Caterpillar Tractor Co., Peoria, Ill., a corporation of California
Filed Sept. 19, 1968, Ser. No. 760,885
Int. Cl. F16h 37/08
U.S. Cl. 74—720.5                                   5 Claims

ABSTRACT OF THE DISCLOSURE

A geared steer, track-type tractor power train embodying a first cross-drive system with a forward/reverse section and optional dual splitter sections, a second cross-drive system with dual planetary multi-speed range transmissions, and an optional planetary differential to enable spot turns.

---

In steering tractors, the clutch-brake steering system is thought to be the simplest of all track steering systems in use today. They provide a definite advantage and have proven their ability to handle rugged steering requirements with a minimum of operating costs. However, the clutch-brake system has a major disadvantage in that power loss occurs, in the form of heat generated by the brake, when negotiating turns. This problem has been partly solved through the provision of oil-cooling systems for the steering elements.

Other disadvantages of clutch-brake steering system are the lack of continuous power delivery to the slower speed track during a turn and the necessity to cross-steer. Cross-steering involves disengaging a steering clutch on the side opposite to the desired direction of turn when the engine is acting as a brake, i.e., the load is pushing the tractor.

These disadvantages have become more serious in view of the current requirement for a track-type tractor capable of a higher top speed and a higher power-to-weight ratio. Ground speeds in the area of 12–15 m.p.h. are desired as opposed to speeds of about 8 m.p.h. which are available today. This necessitates a transmission having a wider range and/or more ratios.

A further problem which must be solved is that of providing better tractor balance. For example, when a tractor is used for bulldozing work it tends to be "nose-heavy." The obvious solution is to move the engine towards the rear of the tractor, but the present longitudinally arranged planetary power shift transmissions do not permit such movement of the engine.

In addition to all of these problems, improved steering systems are sought which will allow pivot turning, spot turning, and power turning.

In solving these problems, it must be borne in mind that track-type tractors are unique vehicles in many respects, one of these being steerability. Urging a tracked machine to deviate from a straight-ahead direction is relatively simple, but steering stability can raise a complex problem when the many forces possible react upon the vehicle. In order to cause a track laying tractor to turn, it must be given angular motion. This is called "slewing" because of lateral skidding that must take place between the track and the ground. Slewing is accomplished by changing the speed of one track relative to the other. The resistance to turn is determined, to a large extent, by tractor weight, length of track on the ground, and high adhesive strength of the soil. Two general conditions can exist in affecting a turn. If the slewing couple is in excess of the resistance to slewing, angular acceleration will result, and the turn being made will be of a varying radius. When the force couple is equal to the resistance, then a constant angular velocity is attained and a constant radius turn is achieved.

Therefore, it is an object of this invention to provide a tractor transmission which will provide highly desirable steering characteristics while obviating all of the above described disadvantages of currently available systems.

It is also an object of this invention to provide such a system wherein separate transmissions for each track provide a variety of steering turn radii by driving the right and left hand tracks at different speeds.

It is also an object of this invention to provide such a device wherein a two-speed, narrow-range transmission driving each main transmission provides a long radius turn in each of the main transmission speeds.

It is a further object of this invention to provide such a device wherein two bevel gears provide a full set of speeds in both forward and reverse, with a minimum of mechanism.

It is also an object of this invention to provide such a device wherein a braked differential connected to both transmission outputs provides a spot turn (one track reversed) in each gear, with one transmission engaged, the other neutral, and the differential's third member braked.

It is also an object of this invention to provide such a device wherein a spring-engaged, hydraulically-released brake on the differential carrier also serves as an emergency "fail-safe" brake, a parting brake, and an energy-absorbing brake, if desired, to be used when changing the tractor's direction.

It is a further object of this invention to provide such a device wherein either of the two main transmissions can have its output stopped by engaging two clutches in the main transmission while disengaging both clutches in the two-speed narrow-range transmission.

It is a still further object of this invention to provide such a device having a speed-change transmission which is smaller and lighter than the steering system driven by a torque multiplying transmission.

It is also an object of this invention to provide such a device wherein the dual, transverse cross-drive arrangement with included differential provides a high-speed, wide range transmission in a shorter length, thereby improving tractor balance when equipped with a bulldozer blade or the like.

It is also an object of this invention to provide such a device wherein the main transmission incorporates integral braking means of an oil-cooled, disc-type construction that needs no adjustment over the typically commercially available band-type braking system.

It is also an object of this invention to provide such a system which produces an increase in the turning radius with an increase in tractor speed.

It is a further object of this invention to provide such a device which produces pivot, spot, and power turns in a dual cross-drive arrangement.

It is a still further object of this invention to provide a power train which not only transmits increased horsepower, but also contributes to the cause of a high power-to-weight ratio by being lighter than currently available systems.

Other objects of the invention will become apparent to those skilled in the art upon perusal of the following description of preferred embodiments depicted in the drawings which are intended to illustrate, but not to restrict, the scope of the invention.

Other embodiments or equivalents of the invention will be obvious to those skilled in the art without departing from the scope of the invention as defined in the appended claims.

In the drawings:

FIGS. 1–3 illustrate examples of the relative size and direction of forces exerted by the tractor tracks in executing a gradual turn, pivot turn, and spot turn respectively;

FIG. 4 shows a schematic diagram of a six-speed transmission incorpodating a double cross-shaft system;

FIG. 5 shows a schematic illustration of an alternate embodiment of a six-speed transmission incorporating the double cross-shaft system;

FIGS. 6 and 7 are schematic illustrations of further alternate embodiments of the invention.

Referring now to the drawings in greater detail. FIGS. 1–3 illustrate the types of turns that are possible with a track-type machine. The gradual turn shown in FIG. 1 can be executed by a number of short straight ahead maneuvers describing a series of arcs and chords tangent to the radius of turn. This can be accomplished by a conventional clutch-brake steer system. On the other hand, a continuous path may be produced by a geared or power steer mechanism of proper ratio for the desired radius turn, or by an infinitely variable ratio mechanism such as a hydrostatic drive. Powering the individual tracks at separate rates of speed, as shown by the arrows on the tracks in FIG. 1 causes such a power turn.

On the other hand, a pivot turn is produced by locking one track and powering the opposite track in a forward or reversed direction as shown in FIG. 2.

Only vehicles equipped with independent drive to each track are capable of spot turning, since it is necessary to reverse the direction of one track relative to the other to bring about this result. This is shown by the opposite arrows on the tracks in FIG. 3.

Referring now to FIG. 4, there is shown a tractor power train comprising an engine 10, a torque converter 12, a first cross-drive system 14, a second cross-drive system 16, and outputs to final drive systems 18 and 19, which may comprise a single or double reduction gearing arrangement which powers the track driving sprockets. The first cross-drive system 14 comprises a centrally located forward/reverse transmission 20 and dual, narrow range splitter transmissions 22 and 24, respectively, driving the left and right tracks. Forward/reverse transmission 20, with dual bevel gears 26 and 28, is provided powder from torque converter 12 via an input bevel gear 30. Bevel gears 26 and 28 work in conjunction with a reverse rotating clutch 32 and a forward rotating clutch 34 to selectively drive annular discs 36 and 37, thereby driving cross-shaft 38. The placement of the clutches 32 and 34 outside of the bevel gears 26 and 28 allows the bevel gears to be more closely located, permitting a smaller input gear 30 and a greater reduction of speed to the bevel gears. Therefore, the lowed relative speed of the disengaged forward or reverse clutch disc and plates decreases no-load horsepower losses, and lessens the harshness of engagement of these clutches.

The output from the forward/reverse transmission is directed to the splitted transmission via shaft 38. A single planetary train 40 embodying a sun gear 42, planet gears 44, and a ring gear 46, in addition to low and high range rotating clutches 48 and 50, comprise the essential elements of splitter transmission 22. In low range, cross-drive 38 directly powers ring gear 46 to cause the planets 44 to circumnavigate sun gear 42 affixed to a housing 52. In turn, this causes a planet carrier 54 to drive a power transfer gear 56 due to the engagement of low clutch 48. In high range, power transfer gear 56 is driven directly by cross-shaft 38 due to the engagement of clutch 50.

The left splitter transmission output via transfer gear 56 is delivered to a power transfer gear 58 and to a left three speed main transmission 60 in the second cross-drive system 16. The output from main transmission 60 is by way of a planet carrier 62 and a cross-shaft 64 in communication with final drive 18. More particularly, main transmission 60 embodies two planetary sets 66 and 68, low and intermediate brakes 70 and 72, and a rotating clutch 74. The first epicyclic train 66 comprises a sun gear 76, planet gears 78, and a ring gear 80. The second train comprises a sun gear 82, planet gears 84, and a ring gear 86.

In low, brake 70 is engaged holding ring gear 86 stationary so that the input, from a hub 88 to sun gear 82, affects rotation of planets 84 and output carrier 62.

In intermediate, brake 72 holds ring gear 80 stationary and the input through sun gear 76 is directed to the planetary gears 78 and to an output carrier 90 which is directly affixed to ring gear 86 of the second planetary set. This provides a higher speed drive to output carrier 62 since sun gears 76 and 82 rotate together.

A third speed is achieved through actuation of rotating clutch 74. Once clutch 74 is engaged, the entire assembly rotates as a unit to achieve direct drive of cross-shaft 64.

A differential gear arrangement 94 is situated between the left transmission 60 and the right transmission 92. Differential gear 94 comprises a spring engaged and hydraulically disengaged brake 96 which is connected to the differential's third member—a planet carrier 98. Carrier 98 supports a plurality of compound planets 100 on the left side that mate with similarly supported compound planet 102 on the right. If the left transmission 60 is driving cross-shaft 64 and providing an input to differential 94 via a sun gear 104, and the right transmission 92 is in neutral, compound planets 100 are forced to rotate in a first direction. Each inner gear 106 of compound planet 100 mates with two of the inner gears 108 of compound planet 102, forming a circle causing rotation of compound planet 102 in the opposite direction due to fixed carrier 98. This causes reverse rotation of sun gear 110, a cross-shaft 112 on the right, and the right hand final drive system 19 to effect a spot turn. Such a spot turn, with one track reversed, can be provided in each gear.

In addition to the differential-spot turn-steering arrangement mentioned above, pivot turns can be accomplished by stopping the output of either of the two main transmissions 60 or 92 by engaging two of the brake or clutch elements in the main transmission, while at the same time disengaging both clutches of the splitter transmission so that there is no input to the appropriate main transmission. For example, engaging brakes 70 and 72 while at the same time disengaging splitter transmission clutches 48 and 50 will cause the braking of output cross-shaft 64. At the same time power may be transmitted through the right portion of the power train and drive cross-shaft 112 and final drive 19 at any of several speeds to provide a pivot turn with one track stopped.

Gradual power turns, of the type shown in FIG. 1, may also be provided by this structure in the following manner. If the right hand track receiving power from shaft 38, is in the sixth forward gear, i.e., the clutches equivalent to clutches 50 and 74 are actuated in the right hand system, the left track can be in any one of the following five gear steps, each of which provides a different radius power turn. The following chart illustrates examples of the variation of turn radii with varying left hand forward gear.

CHART FOR LEFT FORWARD POWER TURN WITH RIGHT SIDE IN SIXTH GEAR

| Speed: | Clutches engaged | Exemplary turn radius |
|---|---|---|
| 5th gear | 48 and 74 | 45' |
| 4th gear | 50 and 72 | 19' |
| 3rd gear | 48 and 72 | 14' |
| 2nd gear | 50 and 70 | 10' |
| 1st gear | 48 and 70 | 9' |

FIG. 5 shows a schematic illustration of an alternate embodiment of the invention wherein a six-speed transmission incorporates a double cross-shaft system. The figure shows a tractor power train comprising an engine 110, a torque converter 112, a first cross-drive system 114, a second cross-drive system 116, and outputs to final drive systems 118 and 119 which may comprise a single or double reduction gearing arrangement which powers a track driving sprocket. More particularly, the first cross-drive system 114 comprises a centrally located foward/reverse transmission 120 and dual, narrow range splitter transmissions 122 and 124 respectively driving the left and right tracks.

The forward/reverse transmission 120 with dual bevel gears 126 and 128 is powered by torque converter 112 via an input bevel gear 130. The bevel gears 126 and 128 work in conjunction with a reverse rotating clutch 132 and a forward rotating clutch 134 to selectively drive an annular disc 136 and a cross-shaft 138. The output from the forward/reverse transmission is directed to the splitter transmissions via shaft 138.

The left splitter transmission 114 receives its input from the forward/reverse unit through the cross-shaft 138 and directs it rearwardly to the left three speed transmission 116 through the dual transfer gears 137 and 139. The power is passed through the transfer gear 137 by engagement of the low speed rotating clutch 140 and through the transfer gear 139 by engagement of the high speed rotating clutch 142.

Low and high speed transfer gears 144 and 146 provide the input to the left three speed transmission and two epicyclic gear trains 150 and 152. The planetary set 150 comprises an input sun gear 154, planet gears 156, a ring gear 158, and an output planet carrier 160. The planetary set 152 comprises an input sun gear 162, planet gears 164, a ring gear 166, and an output planet carrier 168.

The low speed range is achieved by actuation of a break 170 to hold ring gear 158 fixed. The action of the input, via sun gear 154, is then transmitted through planet gears 156 to carrier 160 and to a cross-shaft 172.

Intermediate range is achieved through engagement of a brake 174, which holds ring gear 166 fixed. Since the planet carrier 168 is also affixed to ring gear 158, as shown, a compound action is established by the dual input through sun gears 154 and 162 to achieve an intermediate speed output at carrier 160.

A high speed range is achieved by engagement of a rotating clutch 176. Engagement of the clutch causes direct drive and rotation of both planetary sets as a unit.

A separate parking and service brake arrangement may be provided as at 178 which is in direct communication with planet carrier 160 and shaft 172.

An optional differential 180 may also be included for spot turns as heretofore described. If the optional differential is used, parking brake 178 is not needed, since the differential provides a "fail-safe" braking function. On the other hand, even though the brake 178 is not needed with this differential 180, its addition to the system can, under some circumstances, simplify the control system.

FIGS. 6 and 7 of the drawings disclose further alternate embodiments of the invention having five-speed and four-speed range transmissions, respectively.

FIG. 6 shows a converter driven bevel gear 230 which meshes with gears 226 and 228 on a transverse center line, driving them in opposite directions. These latter gears drive clutches 236 and 237, which in turn drive the output in one direction or the other depending upon which is engaged. This constitutes a forward/reverse transmission, but without a splitter unit as used in the previously described embodiment.

The output of the forward/reverse transmission is applied through a gear 250 to a pair of identical five-speed transmissions 252, one of which has been shown.

Selective actuation of clutches 253–256 in accordance with the following chart provides a controlled gear speed through an output carrier 262. The output carrier, in turn, may drive either a final drive 264 directly, or an optional differential 266, as disclosed previously, which, in turn, will drive the final drive.

| Speed: | Clutches engaged | Exemplary. m.p.h. |
| --- | --- | --- |
| 1st gear | 253, 256 | 2.18 |
| 2nd gear | 254, 256 | 4.29 |
| 3rd gear | 253, 255 | 6.65 |
| 4th gear | 254, 255 | 9.08 |
| 5th gear | 253, 254 | 12.00 |

As in the previously described embodiments, this system also provides a braked condition so that the tractor brakes are actually included in the transmission, rather than being of the band type brake commonly used. Since such braking is of a disc type, with oil cooling, they will need no adjustment. Additionally, each of the five-speed transmissions can be put in different gears to vary the turning radii.

In the embodiment of FIG. 6, engagement of the clutches 253 and 254 causes the transmission to drive straight through at a 1:1 ratio, i.e., top speed—fifth gear. On the other hand, actuation of both of the brakes 255 and 256 will stop the output entirely. By making both brakes so as to be spring applied, they can serve as parking and emergency brakes in case of a loss of hydraulic pressure.

The embodiment of FIG. 7 is an alternate transmission which may be used with the above described forward/reverse transmission to give four speeds or may be used with a splitter transmission to give eight forward and eight reverse speeds. This dual planetary arrangement incorporates two rotating clutches and two stationary clutches which provide speed gearing in accordance with the following chart.

| Speed: | Clutches engaged |
| --- | --- |
| 1st gear | 353, 355 |
| 2nd gear | 353, 356 |
| 3rd gear | 353, 354 |
| 4th gear | 354, 356 |

In utilizing this embodiment, engagement of the brakes 355 and 356 will provide a pivot turn, and braking may be achieved through engagement of a third brake (not shown).

Thus, the applicants have provided a true advance in the art of high speed tractor transmission, since the speed of the tractors have been increased while further improving the vehicle characteristics.

Having described the preferred embodiments of the machines, it must be understood that this invention is not to be limited to the precise details shown, but rather to the full range of alterations and equivalents available under the limitations set forth in the following claims.

What is claimed is:

1. In a high speed tractor transmission system,
   a fixed body,
   a first output shaft in said body,
   a pair of first input gears mounted coaxially with said first output shaft,
   a first pair of selectively engageable clutches located adjacent said first input gears,
   each of said first clutches having an input member connected to one of said first input gears and an output member connected to said first output shaft,
   a first output gear mounted coaxially with said first output shaft,
   a first main transmission output shaft,
   said first output gear providing power to said first main transmission output shaft via
   a first main input gear mounted coaxially with said first main output shaft,
   a first plurality of main epicyclic gear trains mounted coaxially with said first main output shaft,
   a second output gear mounted coaxially with said first output shaft,
   means selectively controlling the actuation of selected portions of said first main epicyclic gear trains, at least one of said selective controlling means having a portion fixed to said body and a portion linked to said first main epicyclic gear trains, and means connecting a portion of one of said first main epicyclic gear trains to said first main output shaft, a second main transmission output shaft, said second output gear providing power to said second main transmission output shaft via a second main input gear mounted coaxially with said second main output shaft, a second plurality of main epicyclic gear trains mounted coaxially with said second main output shaft, means selectively controlling the actuation of selected portions of said second main epicyclic gear trains, at least one of said selective controlling means having a portion fixed to said body and a portion linked to said second main epicyclic gear trains, and means connecting a portion of one of said second main epicyclic gear trains to said second main output shaft.

2. The transmission system of claim 1 including a first epicyclic gear train mounted coaxially with said first output shaft, a second epicyclic gear train mounted coaxially with said first output shaft, and means selectively engaging said first epicyclic gear train with said first output gear, and means selectively engaging said second epicyclic gear train with said second output gear.

3. The transmission system of claim 1 including means selectively connecting said first main input gear to said first main epicyclic gear trains, and means selectively connecting said second main input gear to said second main epicyclic gear trains.

4. The transmission of claim 3 including means selectively engaging said first and second output gears to said first output shaft, and differential means connecting said first and second main output shafts.

5. The transmission system of claim 4 including a spring actuated brake means mounted on said differential means.

References Cited

UNITED STATES PATENTS

| | | | |
|---|---|---|---|
| 1,872,541 | 8/1932 | White | 74—695 |
| 2,314,664 | 3/1943 | Shenstone | 74—710 X |
| 3,033,325 | 5/1962 | Tjernstrom | 188—170 |
| 3,195,692 | 7/1965 | Herr et al. | 188—170 |
| 3,398,605 | 8/1968 | Ainsworth et al. | 74—720.5 |
| 3,405,574 | 10/1968 | Livezey | 74—720.5 |
| 3,425,296 | 2/1969 | Livezey | 74—720.5 |

ARTHUR T. McKEON, Primary Examiner